(12) United States Patent
Evanovich et al.

(10) Patent No.: US 6,619,310 B2
(45) Date of Patent: Sep. 16, 2003

(54) ROTOMOLDED HYDRAULIC RESERVOIR WITH INTEGRAL BAFFLE

(75) Inventors: Steven R. Evanovich, Pittsburgh, PA (US); Alfred L. Baum, Cranberry Township, Butler County, PA (US)

(73) Assignee: Schroeder Industries L.L.C., Mckees Rocks, PA (US)

( * ) Notice: Subject to any disclaimer, the term of this patent is extended or adjusted under 35 U.S.C. 154(b) by 253 days.

(21) Appl. No.: 09/844,494

(22) Filed: Apr. 27, 2001

(65) Prior Publication Data

US 2001/0054445 A1 Dec. 27, 2001

Related U.S. Application Data

(60) Provisional application No. 60/200,452, filed on Apr. 28, 2000.

(51) Int. Cl.[7] .................. F16K 51/00; F16K 24/00; E03B 11/00
(52) U.S. Cl. .................. 137/15.18; 137/549; 137/550; 137/574; 220/4.14; 220/563
(58) Field of Search .................. 137/571, 574, 137/549, 550, 15.18; 220/563, 564, 4.14

(56) References Cited

U.S. PATENT DOCUMENTS

| | | |
|---|---|---|
| 1,310,517 A | 7/1919 | Xardell |
| 1,562,074 A | 11/1925 | Baum |
| 1,909,734 A | 5/1933 | Thwaits |
| 1,924,741 A | 8/1933 | Hoopes et al. .................. 220/86 |
| 2,091,731 A | 8/1937 | Gredell .................. 220/22 |
| 2,379,126 A | 6/1945 | Welden .................. 220/63 |
| 2,538,336 A | 1/1951 | Smith .................. 222/455 |
| 2,675,682 A | 4/1954 | Dobson .................. 62/1 |
| 2,715,040 A | 9/1955 | Rhoads, Sr. .................. 296/24 |
| 2,806,622 A | 9/1957 | Leirer .................. 220/5 |
| 2,860,809 A | 11/1958 | Perry .................. 220/22 |
| 3,364,292 A | 1/1968 | Lemelson .................. 264/275 |
| 3,610,457 A | 10/1971 | Opalewski .................. 220/22 |
| 3,645,416 A | 2/1972 | Main, Jr. .................. 220/22 |
| 4,023,257 A | 5/1977 | Wright et al. .................. 29/460 |
| 4,143,193 A | 3/1979 | Rees .................. 428/35 |
| 4,350,258 A | 9/1982 | Rogers |
| 4,431,027 A | 2/1984 | Sabina, Jr. .................. 137/574 |
| 4,517,231 A * | 5/1985 | May et al. .................. 428/36.92 |
| 4,526,286 A | 7/1985 | Jung et al. .................. 220/22 |
| 4,611,724 A | 9/1986 | Watkins et al. .................. 220/5 A |
| 4,638,836 A | 1/1987 | Bailey .................. 137/574 |
| 4,664,958 A | 5/1987 | Jones .................. 428/36 |
| 4,789,170 A | 12/1988 | Reber .................. 280/5 D |
| 4,847,028 A | 7/1989 | Snyder et al. .................. 264/155 |
| 4,852,258 A | 8/1989 | Foster .................. 30/276 |
| 4,852,758 A | 8/1989 | Kormendi et al. .................. 220/20.5 |
| 4,994,132 A | 2/1991 | Liekens et al. .................. 156/245 |
| 5,076,703 A | 12/1991 | Loefke et al. .................. 366/61 |
| 5,127,432 A | 7/1992 | Duhaime et al. .................. 137/574 |
| 5,186,324 A | 2/1993 | Brandon, Jr. .................. 206/223 |
| 5,285,923 A | 2/1994 | Brandon, Jr. .................. 220/601 |
| 5,344,038 A | 9/1994 | Freeman et al. .................. 220/453 |
| 5,503,284 A | 4/1996 | Li .................. 215/383 |
| 5,564,749 A | 10/1996 | Branham .................. 280/830 |
| 5,765,713 A | 6/1998 | Geisheker et al. .................. 220/562 |
| 5,850,933 A * | 12/1998 | Pazik .................. 220/563 |
| 5,911,938 A | 6/1999 | El et al. .................. 264/261 |
| 5,960,981 A | 10/1999 | Dodson et al. .................. 220/563 |
| 5,975,687 A | 11/1999 | Powers .................. 347/87 |
| 6,032,819 A | 3/2000 | Hanna .................. 220/501 |
| 6,116,454 A * | 9/2000 | Henderson et al. .................. 220/563 |
| 6,138,857 A | 10/2000 | Keller .................. 220/495.01 |
| 6,161,719 A | 12/2000 | Madison .................. 220/567 |
| 6,220,287 B1 | 4/2001 | Wolf .................. 137/574 |

* cited by examiner

Primary Examiner—A. Michael Chambers
(74) Attorney, Agent, or Firm—BLK Law Group; Blynn L. Shideler; Krisanne Shideler

(57) ABSTRACT

A rotomolded hydraulic reservoir includes a plastic container body defining a container cavity for receiving hydraulic fluid and forming a filter cavity in fluid communication with the container cavity. An integral baffle extends inwardly and is formed as part of an outer wall of the container body. The baffle controls the fluid flow pattern within the container cavity to provide deaeration and homogenization to the fluid.

20 Claims, 7 Drawing Sheets

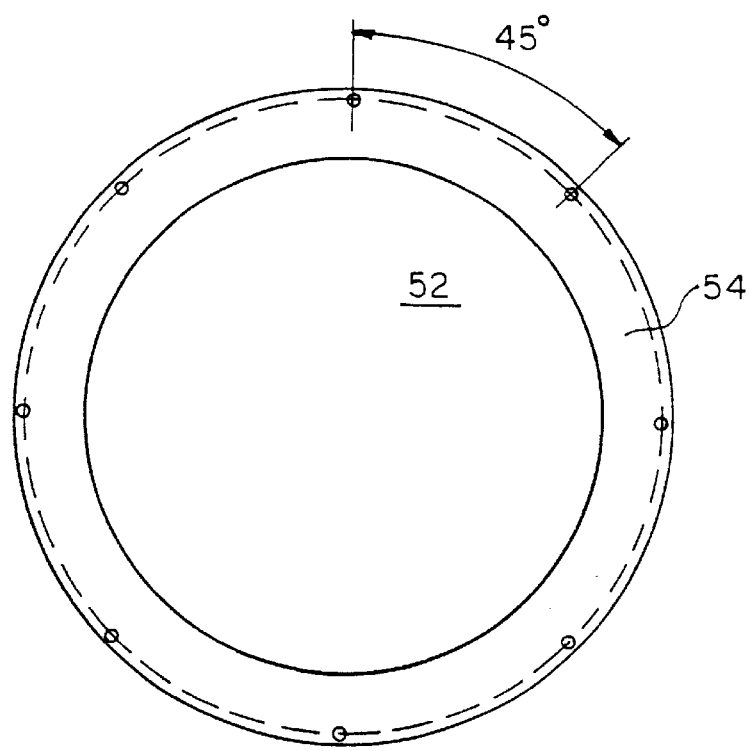
Fig. 6
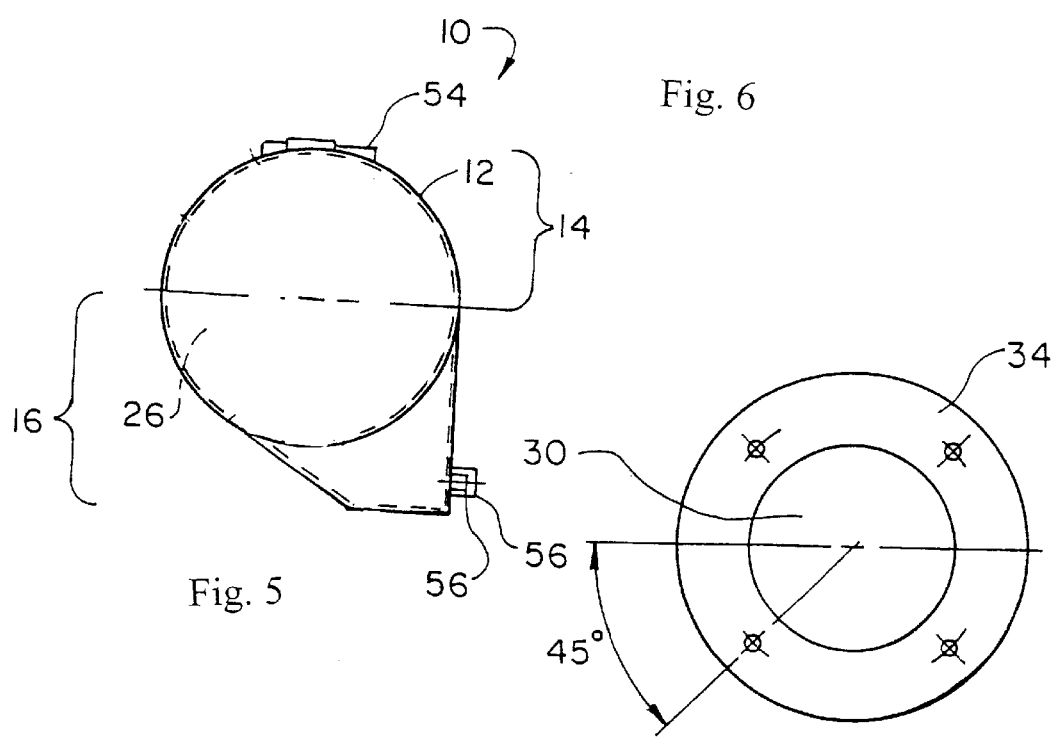
Fig. 5
Fig. 7

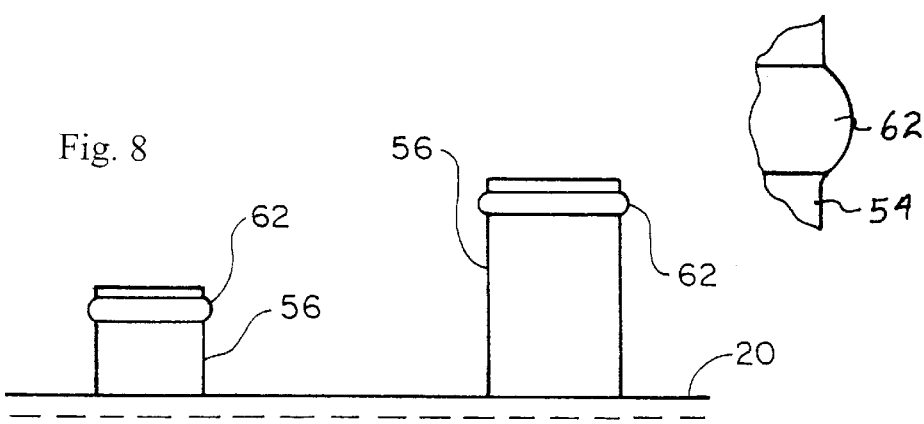
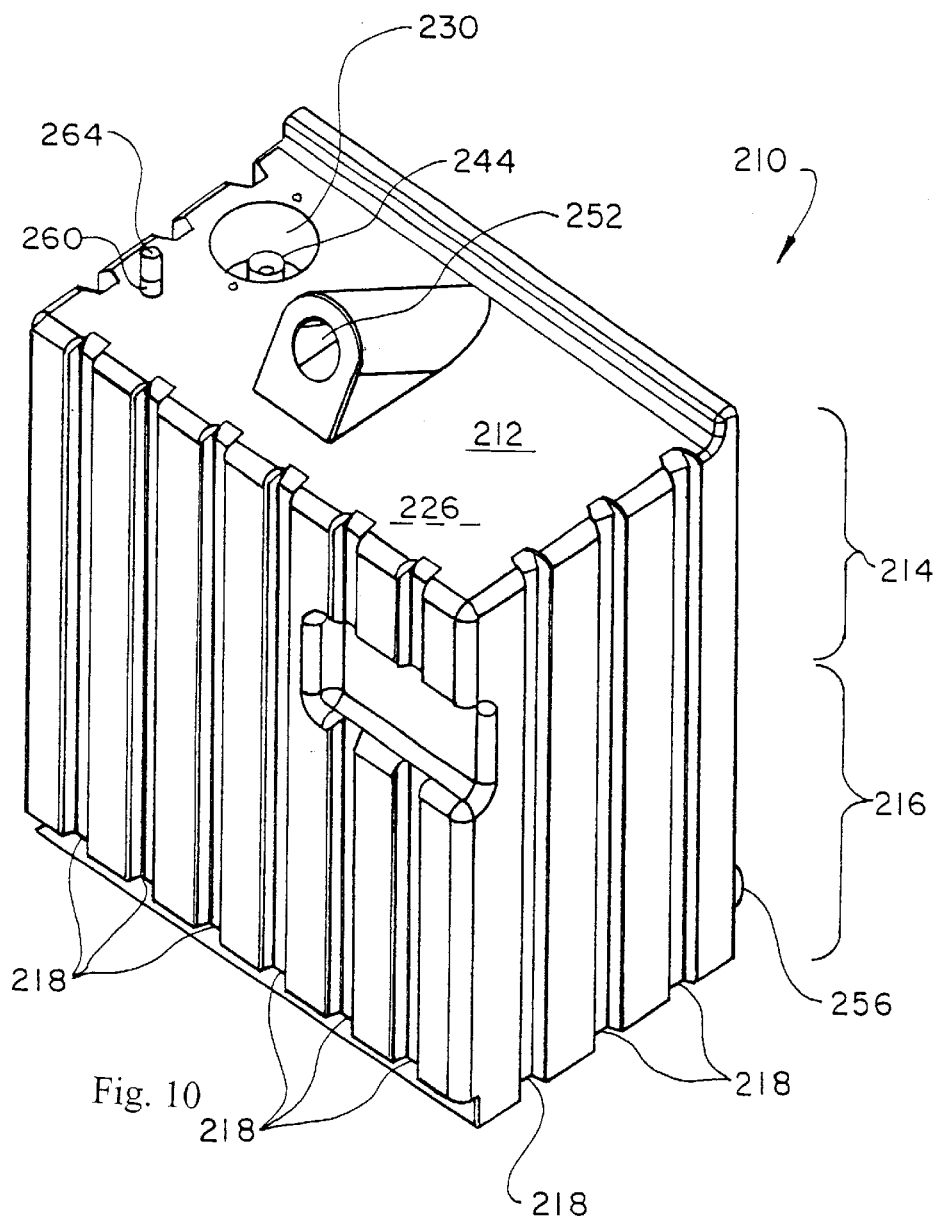

ROTOMOLDED HYDRAULIC RESERVOIR WITH INTEGRAL BAFFLE

RELATED APPLICATION

This application claims the benefit of U.S. Provisional Application Ser. No. 60/200,452 entitled "ROTOMOLDED HYDRAULIC RESERVOIR WITH INTEGRAL FILTER BOWL" filed on Apr. 28, 2000, which is incorporated herein in its entirety.

BACKGROUND OF THE INVENTION

1. Field of the Invention

The present invention relates to a hydraulic reservoir and, more particularly, to a hydraulic fluid reservoir formed by rotational molding with an integral molded baffle.

2. Brief Description of the Prior Art

Rotational molding, or rotomolding, is a well-known method of forming objects from a plastic resin. It is often used for complex shapes including tanks and reservoirs. Various types of plastic resin can be used, such as polyethylenes, plastisols, nylons, fluoropolymers, polypropylenes, polyurethanes, and other suitable materials.

In general, a mold is loaded with a plastic resin and heated in an oven. As the mold is heated, the mold is rotated about two or three axes at a low speed. The heat melts the plastic resin inside the mold and melted resin coats the interior surface of the mold. The mold is then gradually cooled using air or water and the re-solidified plastic resin, which has assumed the shape of the interior walls of the mold, is removed from the mold. This process differs from injection molding in that the plastic resin is not pressurized (other than atmospheric pressure).

U.S. Pat. No. 5,285,923 illustrates the insertion of objects made of a material other than plastic resin into the object to be formed, such as brass inserts molded into a polyethylene material. In general, the insert is placed in a designated spot in the mold and the rotomolding process is initiated as described above. The melted plastic resin encapsulates the insert and the insert becomes part of the finished product. A problem is that the expansion and contraction properties of the resin and the inserted objects are not necessarily equal. Leaks or gaps can develop between the inserted object and the cooled plastic resin. This problem is amplified by the fact that plastic resin is known to shrink an appreciable amount as it cools. U.S. Pat. Nos. 3,364,292; 4,023,257; and 4,847,028; also discuss rotomolding with inserts added to the molded product. All of the above-cited references are incorporated herein by reference.

As noted in the above-cited prior art, rotomolding is well-suited for forming a plastic tank or reservoir structure. Such tanks are often used as hydraulic reservoirs for hydraulic systems, such as used in heavy machinery, including cranes, backhoes, demolition shears, bulldozers, and the like. In hydraulic systems, it is important to keep the hydraulic fluid free of debris. Consequently, filtering elements have been incorporated in the hydraulic systems to filter debris from the hydraulic fluid. Further, as set forth in U.S. Pat. Nos. 4,143,193 and 5,911,938 baffles are often incorporated into hydraulic reservoir tanks, as well as fuel tanks, to dampen the forces of moving liquid within the tank. The baffle designs suggested in these patents are formed of additional elements integrated into or integral with the finished tank. Additional holding fixtures are required during molding and these designs increase the complexity of the mold, and result in an increase in manufacturing time and expense.

It is an object of the present invention to provide a rotomolded hydraulic reservoir with an integral molded baffle. It is a further object of the present invention to provide a rotomolded hydraulic reservoir with integral filter bowl having an extended integral filter container with a coupling insert. It is another object of the present invention to provide a rotomolded hydraulic reservoir with a second fluid return. It is another object of the present invention to provide a hydraulic reservoir that is economically manufactured. It is a further object of the present invention to provide an effective, easily replaceable filter element for a hydraulic reservoir.

SUMMARY OF THE INVENTION

The above objects are achieved with a rotomolded hydraulic reservoir having an integral molded baffle according to the present invention. A baffle is a term referring to a structure that significantly affects the fluid flow in the hydraulic reservoir. The hydraulic reservoir is a one-piece tank structure. Specifically, the hydraulic reservoir includes a rotomolded one-piece, integral plastic container body defining a container cavity for receiving the hydraulic fluid. The container body has an integral molded baffle extending inwardly and formed as part of an outer wall of the container body, wherein the baffle extends at least a third of the depth of the container cavity. The container body may form the integral solid baffle within the container cavity extending from one side of the container body wherein the sides of the baffle converge toward each other from the side of the container body toward the mid-line of the container cavity at an appropriate shallow angle, such as about six degrees (plus or minus two degrees). The baffle may extend substantially across a lower portion of the container cavity with a gap in the baffle extending to a bottom surface of the container body. The baffle may extend substantially perpendicular to a longitudinal axis of the container body.

The container body may form a filter cavity in fluid communication with the container cavity. A filter element coupling insert, such as a machined metallic bushing, may be molded in the container body adjacent the filter cavity. A removable filter element is positioned within the filter cavity and coupled to the insert. The removable filter element seals to the exterior of the insert.

In order to help ensure a positive seal between the resin and the part to be included, the present invention generally provides a container body forming a filter cavity with an end having, in cross section, a bowl-shape. The insert is positioned adjacent to the cross sectional bowl-shape of the filter cavity. The bowl-shape offers controlled shrinkage tolerances in the general vicinity of the insert.

In one embodiment of the present invention, the fluid communication provided between the filter cavity and the container cavity is provided to extend to a level below the normal fluid level in the hydraulic reservoir. Additionally, a second fluid return communicating with the container cavity may be provided in one embodiment of the present invention with the second fluid return including an integral metallic coupling insert. The second fluid return may be provided with a fluid communication with the container cavity at a level lower than the fluid level within the container cavity through an extended coupling insert. A normal fluid level for a hydraulic reservoir varies between rest and operating conditions. Although dynamic, the term normal fluid level is a specific defined range unique to a given hydraulic reservoir and a given application.

One embodiment of the present invention the solid integrally molded baffle extends from the bottom and only one side of the container cavity to about one-half of the container cavity and substantially the entire width of the container cavity. A gap is provided between the other side and the baffle with the gap extending to the bottom whereby fluid at any level within the container cavity can flow around the integral baffle. Other modifications are possible. For example, the gap would be provided on both sides of the baffle or the baffle could extend on both sides of the gap.

These and other advantages of the present invention will be clarified in the description of the preferred embodiments taken together with the attached drawings in which like reference numerals represent like elements throughout.

BRIEF DESCRIPTION OF THE DRAWINGS

FIG. 5 is an end view of the hydraulic reservoir shown in FIGS. 1–4;

FIG. 6 is an enlarged top view of a manway access of the hydraulic reservoir shown in FIGS. 1–5;

FIG. 7 is a top view of a filter cavity flange of the hydraulic reservoir shown in FIGS. 1–6;

FIG. 8 is an enlarged plan view of outlet ports of the hydraulic reservoir shown in FIG. 1; and FIG. 9 is a further enlarges side view of the bead of an outlet port shown in FIG. 8;

FIG. 10 is perspective view of a rotomolded hydraulic reservoir with integral baffle according to a second embodiment of the present invention;

DETAILED DESCRIPTION OF THE PREFERRED EMBODIMENTS

Figure 4:
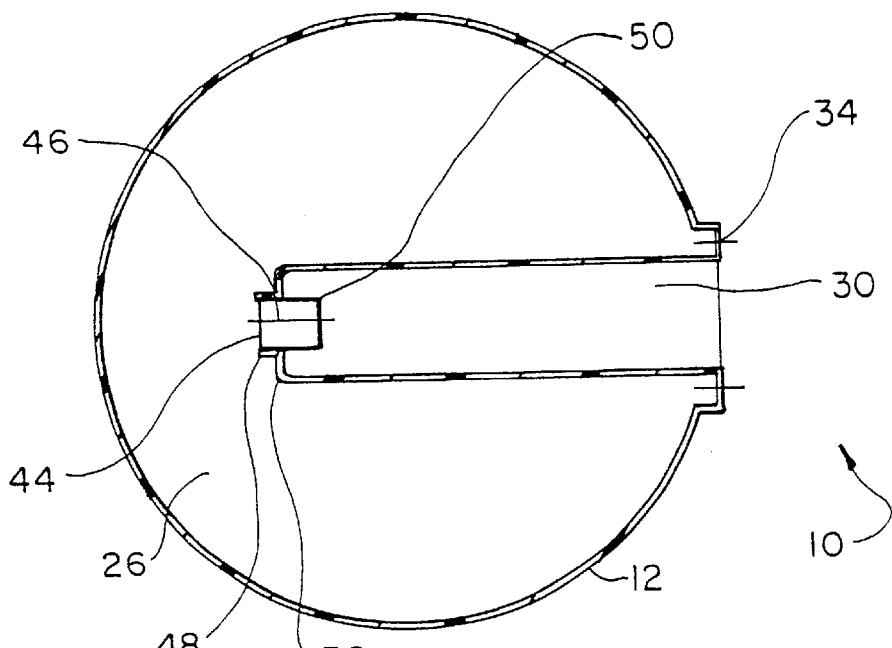
FIG. 4 is a sectional view of a filter cavity of the hydraulic reservoir of FIG. 1.
Figure 2:
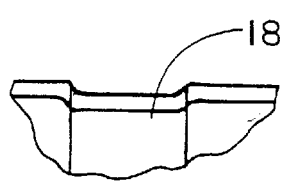
FIG. 2 is an enlarged view of an integral molded rib of the reservoir shown in FIG. 1.
Figure 3:
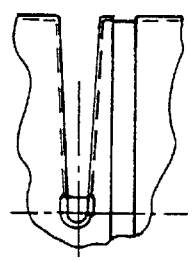
FIG. 3 is an enlarged view of an integral molded baffle of the reservoir shown in FIG. 1.
Figure 1:
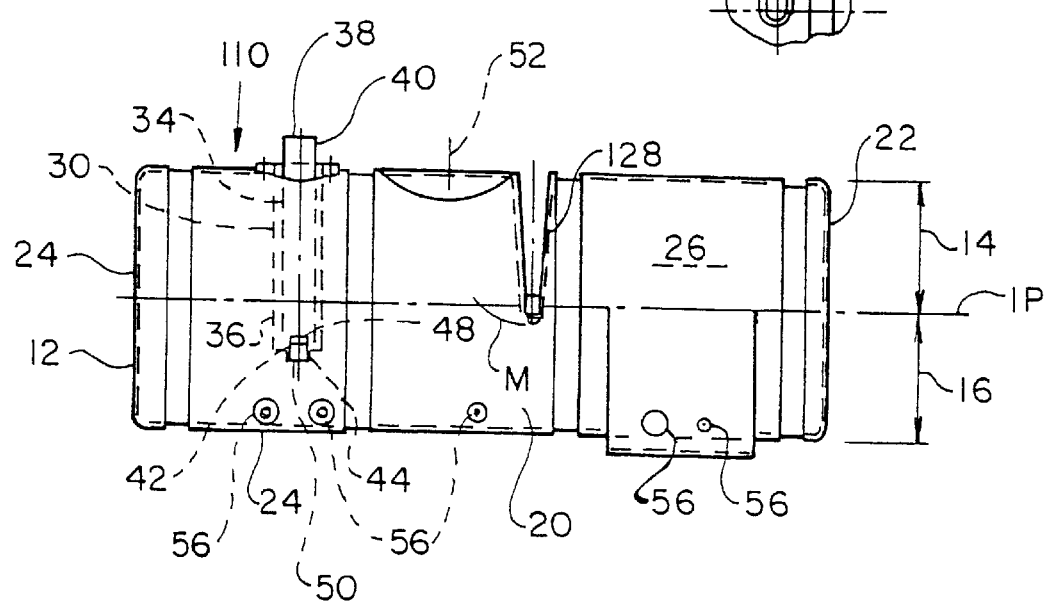
FIG. 1 is a side view of a rotomolded hydraulic reservoir with integral baffle according to a first embodiment of the present invention.
Figure 11:
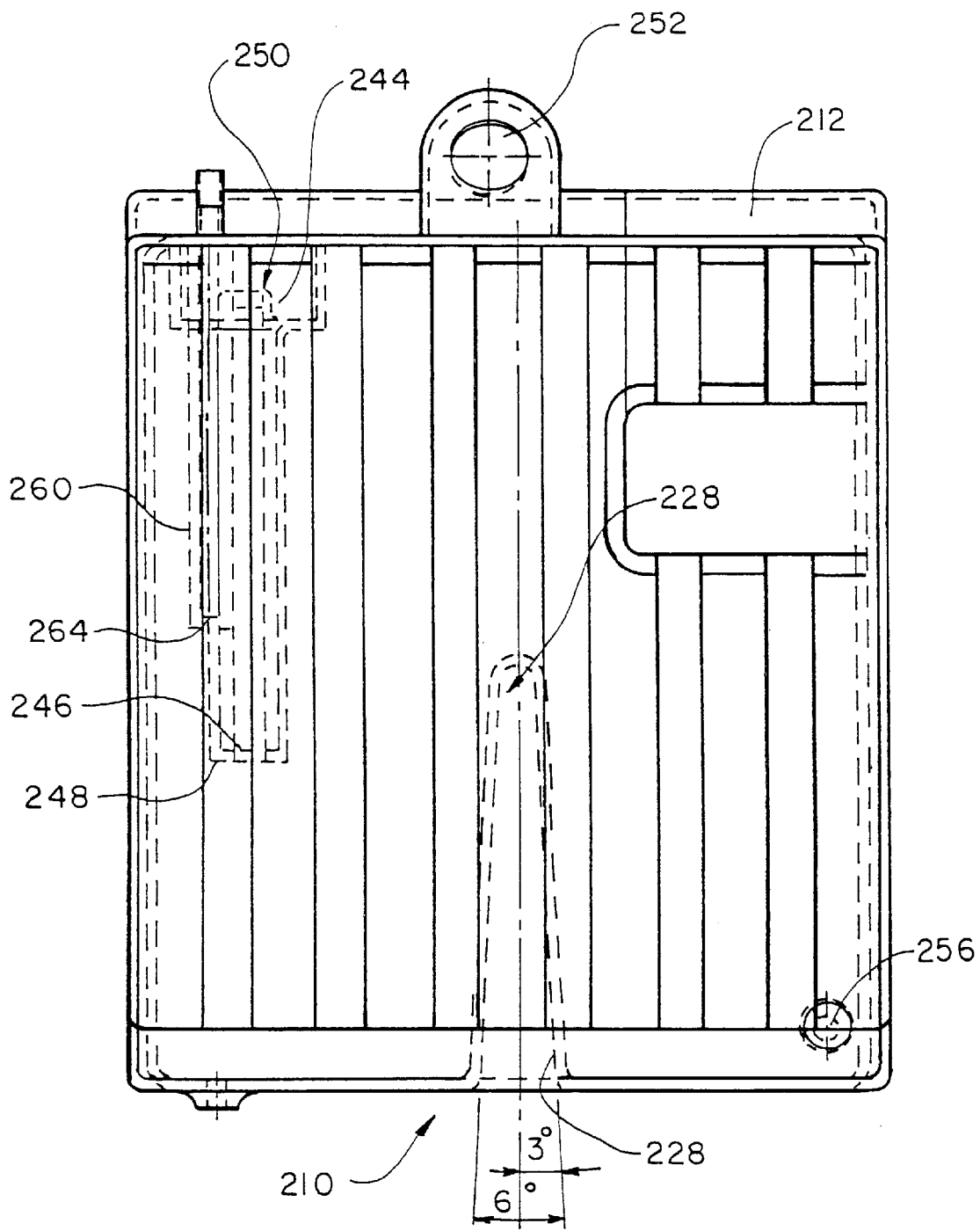
FIG. 11 is a side view of the hydraulic reservoir shown in FIG. 10.
Figure 12:
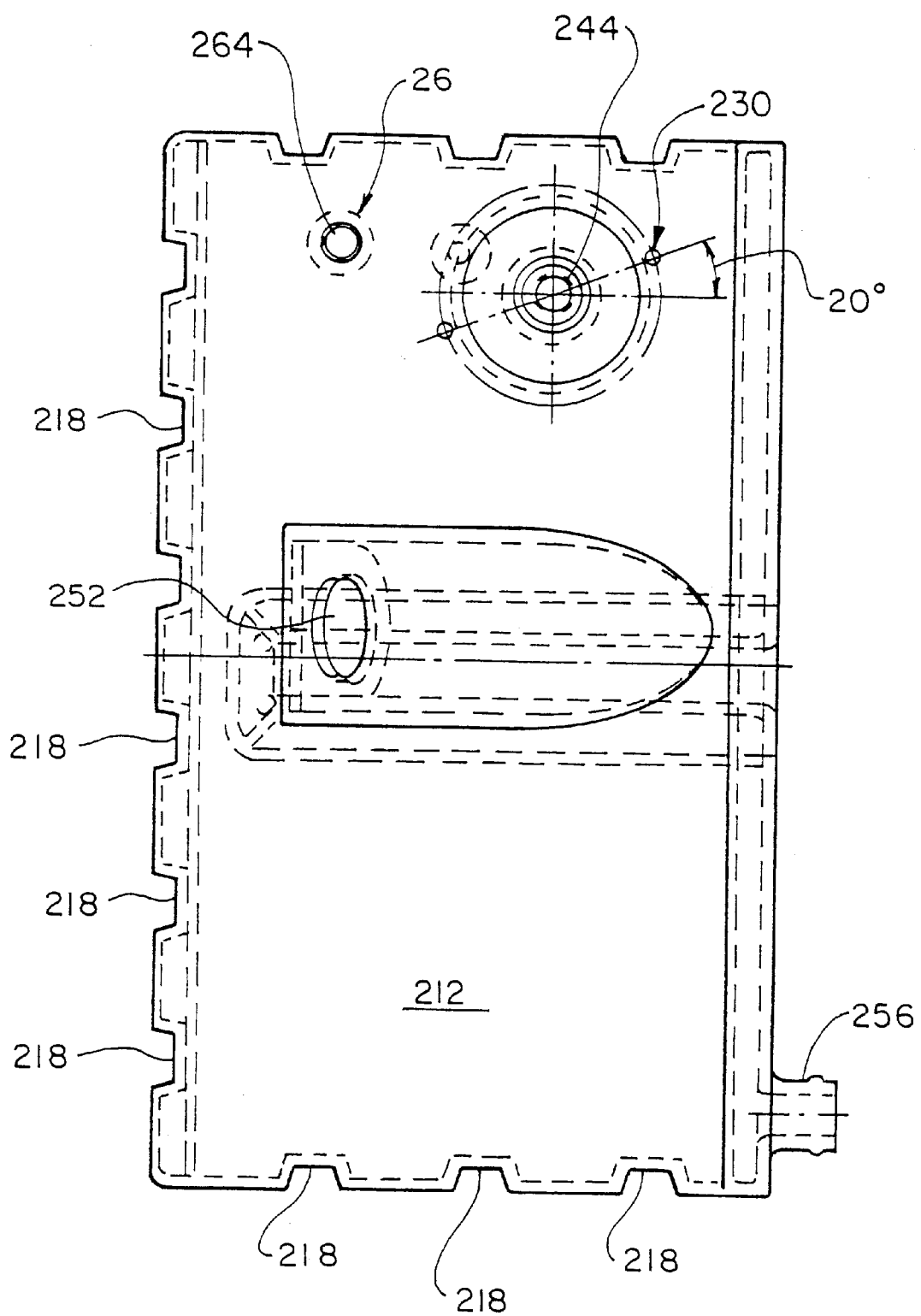
FIG. 12 is a top plan of the hydraulic reservoir shown in FIG. 10.
Figure 13:
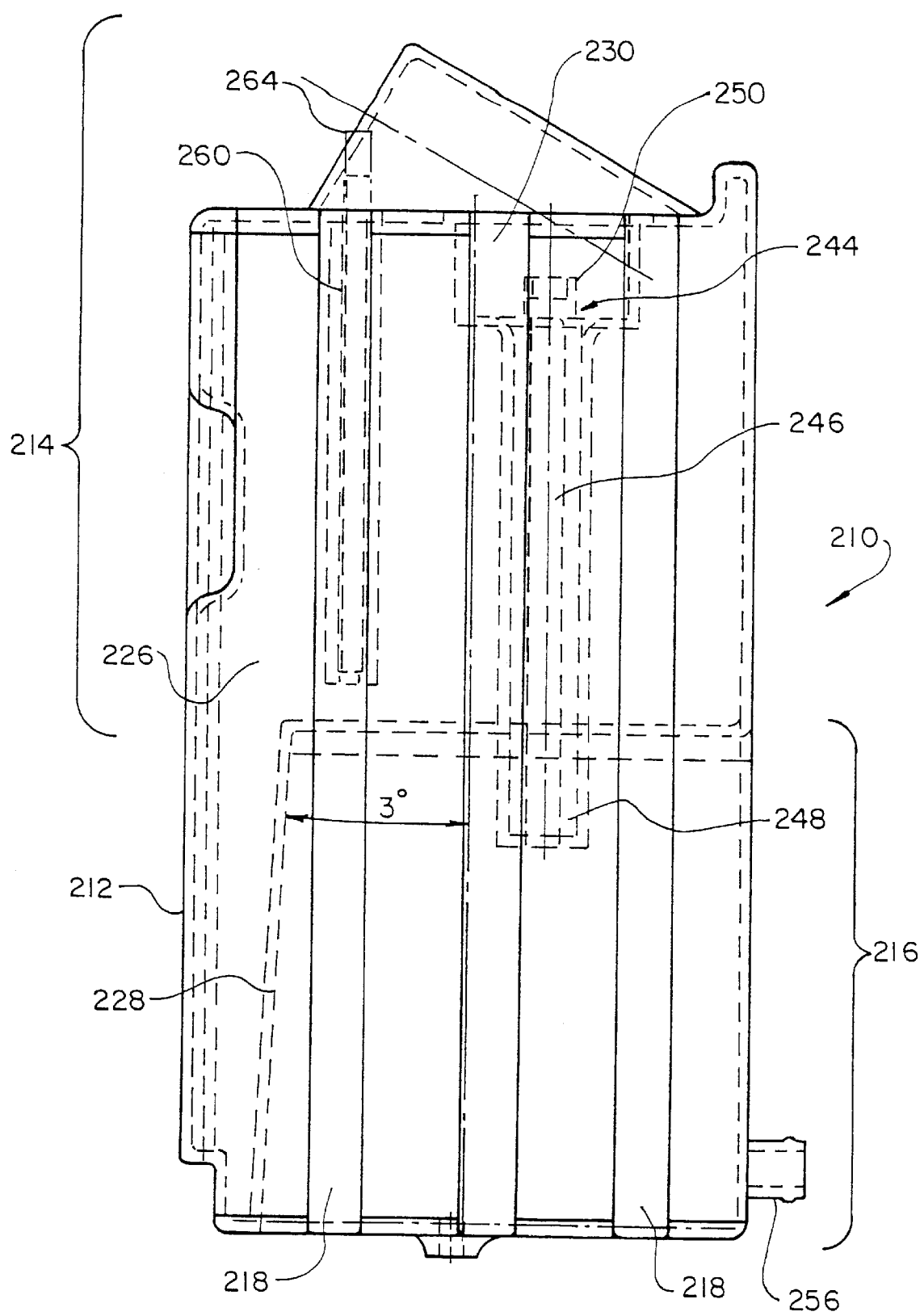
FIG. 13 is an end view of the hydraulic reservoir shown in FIG. 10.
Figure 14:
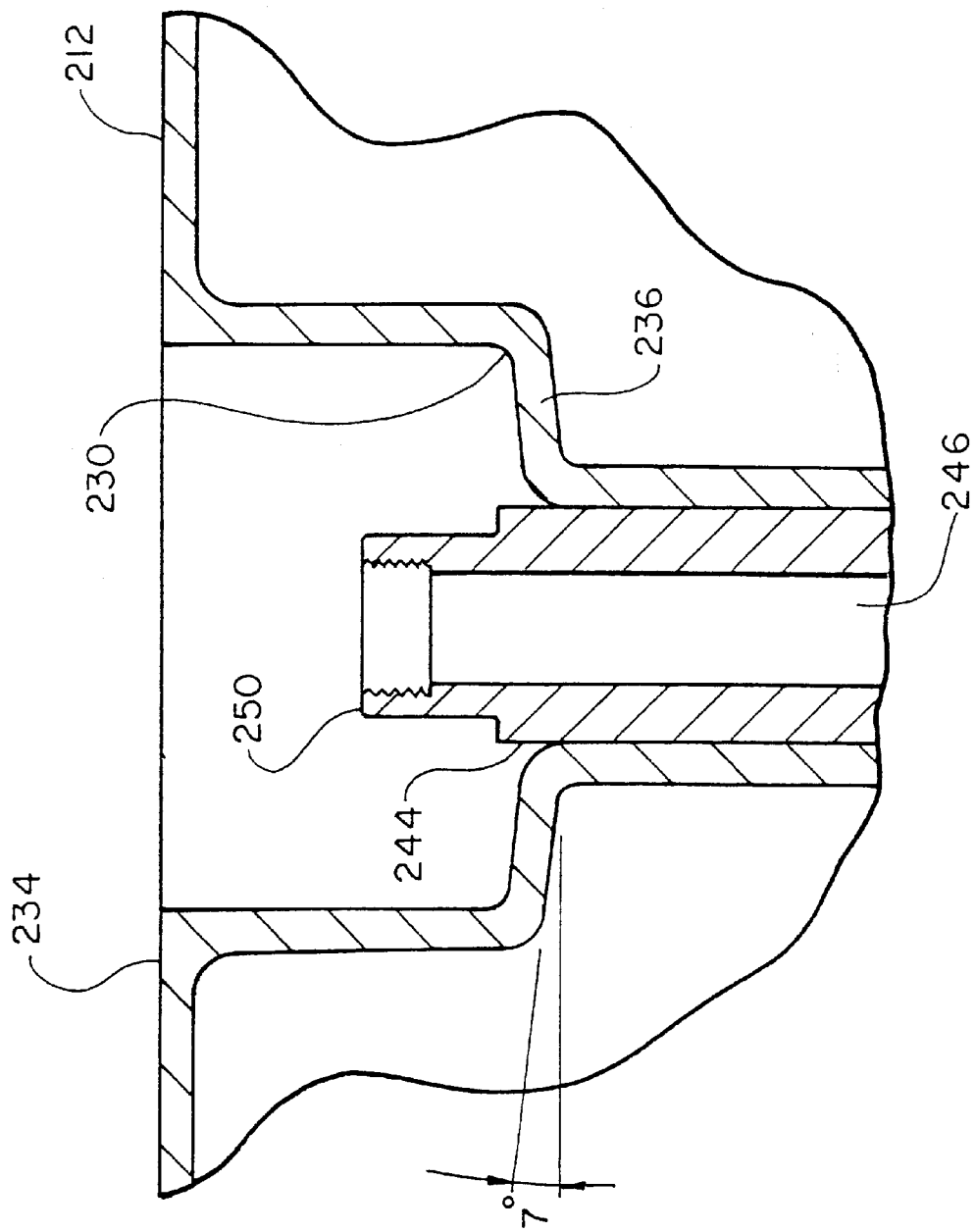
FIG. 14 is an enlarged sectional view of a filter element coupling insert of the hydraulic reservoir shown in FIG. 10.

One embodiment of the present invention is shown in FIGS. 1–9. As shown in FIGS. 1–3, the present invention includes a one-piece integral container or hydraulic reservoir 110 which is a generally cylindrically-shaped. The term "hydraulic reservoir" within the meaning of the application refers to a container for holding working fluid that is conveyed and returned to the reservoir in a circulating system or a holding container for a fuel. Generally, the working fluid is for hydraulic power or for lubrication such as petroleum and water-based fluid. Rotomolding allows for a variety of complex shapes to be easily molded such that the hydraulic reservoir 110 may be rectangular or other shapes dictated mainly by the intended use or environment of the hydraulic reservoir 110. Although the present invention is particularly designed for rotomolding, other molding techniques such as possibly blow molding may be used to form the hydraulic reservoir 110 of the present invention. The hydraulic reservoir 110 has a container body 12 having an upper portion 14, a lower portion 16, a plurality of annular depressions or ribs 18 extending around the hydraulic reservoir 110, an exterior surface 20, a first body side 22, and a second body side 24. The first portion 14 and the second portion 16 are delineated by an imaginary plane passing through a midpoint of the container body 12. The annular depressions or ribs 18, shown in detail in FIG. 2, form reinforcing ridges for the hydraulic reservoir 110 which are particularly useful given the hydraulic reservoir 110 may have an expected operating temperature range of −20 F. to 180 F. The first portion 14, second portion 16, and sides 22, 24 of the hydraulic reservoir 110 form the interior container cavity 26.

The hydraulic reservoir 110 is preferably formed by rotomolding of a plastic resin resistant to chemical reactions with battery acid, hydraulic fluid, oil, transmission fluid, or UV light. Such plastic resins include but are not limited to treated polyethylenes, plastisols, nylon, fluoropolymers, polypropylene, polycarbonate, cellulose acetate, butyrate, elastomers, ionomer, polyurethane, EVA and other specially formulated compounds. The first and second portions 14, 16 and sides 22, 24 are approximately 0.25 inches thick, depending on the material selected and ability to withstand operating temperature range of generally −20 F. to 150 F. and up to 180 F. intermittent. The tensile strength is preferably per ASTMD638 of 2600 PSI and the impact strength should be good to about −20 F./−40 F. The fluid capacity of the container 10 is in excess of 150 gallons, however the container 10 may be sized to the desired operating conditions. These criteria result in the container 10 being well-suited for use as a hydraulic reservoir in the hydraulic system of heavy equipment, such as a mobile crane.

An integral baffle 128 is formed by the outer wall of the upper portion 14 of the reservoir 110. The baffle 128 is shown in detail in FIG. 3 and extends from the upper surface of the hydraulic reservoir 110 into the container cavity 26 to about the centerline of the reservoir 110. The baffle 128 controls the movement of fluid and gases in the container cavity 26 and assures the mixing of oil within the container cavity 26 to assure temperature equalization of the fluid in operation. A baffle is a term referring to a structure within the container body 12 which is designed to effect control and optimize the fluid flow patter within the container body 12. In general, the baffle 128 will provide fluid and thermal homogenization and deaeration within the container cavity 26. The ribs 18, for example, would not be considered as a baffle since the ribs 18 have no appreciable effect on flow within the container body 12. It is expected that an integral molded baffle such as 128 within the meaning of the present invention will extend at least one-third of the depth of the container cavity 26.

The first portion 14 of the container body 12 forms, in cross-section, a generally U-shaped filter cavity 30 which extends toward the second portion 16 of the container body 12. The filter cavity 30 has a first end 34 and a second end 36, with the second end 36 forming, in cross-section, a bowl shape which offers controlled shrinkage tolerances in the general vicinity of a metallic fluid element coupling insert 44 (discussed below). The first end 34 forms a connecting flange for a filter inlet coupling (not shown) to which one or more return lines may be coupled. The filter cavity 30 receives a conventional removable, replaceable filter element 38 connected to the insert 44 positioned adjacent the second end 36 of the filter cavity 30. The insert 44 is preferably a machined aluminum or brass bushing forming an insert cavity or bore 46, a first bushing end 48, and a second bushing end 50. The first bore 46 is preferably threaded for fastening to the inside of the mold during the rotomolding process. A conventional filter element 38 includes a connecting bore coupled to the outside diameter of the insert 44 through a sealing O-ring. The O-ring may be integral with the filter element 38 or provided as a separate element. If the O-ring is integral to the filter element 38, then the filter element 38 with the integral O-ring is pressed onto the insert 44. If the O-ring is a separate element, the O-ring is first positioned around the insert 44 or within the connecting bore of the filter around the insert 44 or within the connecting bore of the filter element 38 and then the filter element 38 is pressed into position. Any type of fluid tight connection between a conventional filter element 38 and the insert 44 is contemplated.

The metal insert 44 provides a more secure seal with the replaceable filter element 38 than having the seal be formed between the filter element 38 and the plastic forming the remainder of the hydraulic reservoir 110. The smooth outside of the insert 44 allows the use of a conventional replaceable filter element 38.

The first portion 14 of the container body 12 also forms the manway access 52 for easily filling the hydraulic reservoir 110 with a fluid, such as hydraulic fluid. The access 52, shown in FIG. 7, is preferably covered with a lid (not shown), preferably a fourteen gauge powder coated metal lid with provisions for an air breather (not shown) and shield (not shown). The lid attaches to the container body 12 via a band or flange 54, which is also incorporated into the upper portion 14 of the container body 12.

Ports 56, such as 1.00 or 1.25 N.P.T. nozzles, are positioned adjacent the second portion 16 of the container body 12. An inside surface 60 of each port 56 is free from plastic resin material. The ports 56 can have a barb 62 for helping to secure a hose with room for a hose clamp. In operation, the ports 56 would supply one or more hydraulic users in the hydraulic system with the hydraulic fluid return being through the filter element 38 which removes debris, such as grit, metal filings, and the like from the hydraulic fluid. The formation of the hydraulic reservoir 110 with integral filter bowl effectively combines the reservoir and the filtering unit while allowing the use of standard replaceable filters. Further, the incorporation of the insert 44 provides an effective seal between the filter element 38 and the container 10.

One method of making a container 10 according to the present invention involves the steps of
(a) positioning an insert 44 into a mold (not shown) configured to form a container body 12 having a filter cavity 30 with a bowl-shaped end;
(b) filling the mold with plastic resin;
(c) heating the resin while simultaneously rotating the mold about two axes; and
(d) cooling the mold.

During the molding process, the lower portion of the insert 44 together with the remaining inserts are encapsulated in the resin. The resulting bowl-shaped profile of the second filter end 36 of the filter cavity 30 offers controlled tolerances in the area of the insert 44. Additionally, the integral baffle 128 formed by the upper portion 14 provides a simple efficient baffle design for the hydraulic reservoir 110 which will control the fluid flow within the container cavity 12.

FIGS. 10–14 show a hydraulic reservoir 210 according to the present invention which is also similar in construction to the hydraulic reservoir 110 described above. The hydraulic reservoir 210 is generally rectangular rather than cylindrical. The hydraulic reservoir 210 includes a container body 212 formed of an upper portion 214 and a lower portion 216 with ridges or ribs 218 formed on three sides of the hydraulic reservoir 210. The container body 212 forms a container cavity 226 for holding the hydraulic fluid.

The container body 212 includes an integral baffle 228 formed by the lower portion 216. The baffle 228 is solid (i.e., no apertures along its surface) and extends about one-half of the inside of the container cavity 226. The specific depth and general shape of the baffle 228 can be modified provided the resulting baffle 228 is effective to control and optimize the fluid flow within the container cavity 226 to provide fluid and thermal homogenization. The baffle 228 extends from one side substantially across the entire width of the container cavity 226. A gap is provided between the baffle 228 and the opposite side with the gap extending to the bottom surface of the container cavity 226. The integral baffle 228 will result in appropriate mixing of the fluid in the container cavity 226 (e.g., homogenization) while assuring that fluid at any level within the container cavity 226 can flow around the baffle 228. The gap may also be provided on both sides of the baffle 228 or even in between the baffle 228. This design avoids the need for more than one drain plug and assures the fluid will not be prevented from reaching the outlet even with a minimum of hydraulic fluid in the container cavity 226.

The hydraulic reservoir 210 includes a filter cavity 230 having a first end 234 and a second end 236 as shown in FIGS. 10–14. The hydraulic reservoir 210 includes a fluid element coupling insert 244 similar to fluid element coupling insert 44 discussed above. The insert 244 includes an integral bore 246, a first end 248 and a second end 250. The insert 244 differs from insert 44 in that the first end 248 extends into the container cavity 226 a significant distance. The insert 244 will extend past the centerline into a position below the normal fluid level line within the container cavity 226. This design will help avoid foaming within the container cavity 226 and will generally improve the fluid flow characteristics within the container cavity 226. The insert 244 uses the same seal with the filter element 38 as the insert 44 described above.

The hydraulic reservoir 210 includes access 252 and ports 256 similar in operation to access 52 and ports 56 described above. Additionally, the hydraulic reservoir 210 is provided a second return line 260 extending into the container cavity 226 to a level below a normal fluid level in the container cavity 226. The second return line 260 includes an integral metal coupling insert 264 for attachment of the second return. The second return line 260 is unfiltered (i.e., it does not have an integral filter, but an independent filter may be placed upstream). Consequently, the second return would be used with a light secondary system (i.e., a system not creating significant wear, grit or the like in the fluid). The second return line 260 also provides the fluid flow advantages offered by the insert 244 by the extended length into the container cavity 226 below the fluid level.

The one-piece rotomolded hydraulic reservoirs 110 and 210 of the present invention provide an efficient integral baffle 128 or 228 without any significant addition to the mold or additional mold inserts or components. The baffles 128 and 228 are part of the outer wall of the hydraulic reservoir 110 or 210 and extend from one side of the hydraulic reservoir 110 or 210 to at least one-third of the container cavity 126 or 226 as measured from the side from which baffle 128 or 228 extends. The integral baffle 128 or 228 can extend from the top, sides and/or bottom of a specific hydraulic reservoir 110 or 210. The specific baffle 128 or 228 should be designed to provide the required thermal and fluid homogenization for all anticipated uses of the specific hydraulic reservoir 110 or 210. This integral molded baffle design provides improvement over the prior art baffle designs while still providing the required control and optimization of the fluid flow.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. A method of making a hydraulic reservoir comprising the steps of:
   (a) positioning a filter element coupling insert into a mold configured to form a container body defining a container cavity and a filter cavity with a bowl-shaped end;
   (b) filling the mold with plastic resin;
   (c) heating the resin while simultaneously rotating the mold about two axes; and
   (d) cooling the mold to form a one piece hydraulic reservoir with integral filter element coupling insert and having an integral baffle, wherein the baffle includes a pair of substantially planar surfaces converging toward each other toward the mid-line of a container cavity, and wherein the planar surfaces are connected by a radius portion at the end of the converging planar surfaces of the integral baffle.

2. A hydraulic reservoir including a one-piece, integral plastic container body defining a container cavity, the container body having a top portion, a lower portion and an integral baffle extending inwardly from one of the top portion or the bottom portion and formed as part of an outer wall of the container body, wherein the baffle extends at least one-third of the depth of the container cavity and the baffle includes a pair of substantially planar surfaces converging toward each other toward the mid-line of the container cavity, wherein the planar surfaces are connected by a radius portion at the end of the converging planar surfaces of the integral baffle.

3. The hydraulic reservoir as claimed in claim 2, wherein the container body further defines an integral filter cavity in fluid communication with the container cavity.

4. The hydraulic reservoir as claimed in claim 3, wherein the container body is rotomolded.

5. The hydraulic reservoir as claimed in claim 2, wherein the container body includes at least one integral outlet port and at least one integral return port, wherein the baffle is positioned between an outlet port and a return port.

6. The hydraulic reservoir as claimed in claim 5, wherein the at least one outlet port is at the bottom portion of the container body.

7. The hydraulic reservoir as claimed in claim 5, wherein a filter cavity forms a fluid return.

8. The hydraulic reservoir as claimed in claim 2, wherein the container body includes a plurality of outlet ports and at least one return port.

9. The hydraulic reservoir as claimed in claim 2, wherein the container body includes a plurality of return ports and at least one outlet port.

10. The hydraulic reservoir as claimed in claim 2, wherein the integral solid baffle within the container cavity is extending from one side of the container body.

11. The hydraulic reservoir as claimed in claim 2, wherein the baffle extends substantially across a lower portion of the container cavity with a gap extending to the bottom portion of the container body.

12. The hydraulic reservoir as claimed in claim 2, wherein the planar surfaces of the baffle converge toward each other at an angle of about six degrees toward the mid-line of the container cavity.

13. The hydraulic reservoir as claimed in claim 2, wherein the baffle extends substantially perpendicular to a longitudinal axis of the container body.

14. The hydraulic reservoir as claimed in claim 13, wherein a filter cavity forms a first fluid return and the reservoir further includes a second fluid return in the upper portion of the container body, the second return including an integral insert.

15. A hydraulic reservoir comprising:
    a plastic container body;
    a container cavity formed by the container body for holding hydraulic fluid, the hydraulic fluid defining a normal fluid level line within the container cavity;
    an integral baffle extending inwardly and formed as part of an outer wall of the container body, to control the fluid flow pattern within the container cavity to homogenize the fluid, wherein the baffle includes a pair of substantially planar surfaces converting toward each other toward the mid-line of the container cavity, and wherein the planar surfaces are connected by a radius portion at the end of the converging planar surfaces of the integral baffle; and
    at least one outlet port positioned near a bottom of the container body in fluid communication with the container cavity.

16. The hydraulic reservoir as claimed in claim 15 wherein the container body is rotomolded.

17. The hydraulic reservoir as claimed in claim 16 wherein the molded baffle extends to at least one-third of the depth of the container body.

18. The hydraulic reservoir as claimed in claim 15 wherein the baffle extends substantially across a lower portion of the container cavity with a gap extending to a bottom surface of the container body.

19. The hydraulic reservoir as claimed in claim 15 further including a second fluid return in the upper portion of the container body, the second return including an integral insert.

20. A hydraulic reservoir comprising:
    a one-piece rotomolded plastic container body;
    a container cavity formed by the container body for holding hydraulic fluid;
    a filter cavity formed by the container body and extending from an upper portion of the container body into the container cavity and in fluid communication with the container cavity, the filter cavity forming a return line for returning hydraulic fluid to the container cavity;
    an integral baffle formed by the container body within the container cavity extending from one side of the container body, wherein the baffle homogenizes and deaerates the fluid in the container cavity, wherein the baffle includes a pair of substantially planar surfaces conversing toward each other toward the mid-line of a container cavity, and wherein the planar surfaces are connected by a radius portion at the end of the converging surfaces of the integral baffle; and
    at least one outlet port positioned near a bottom of the container body in fluid communication with the container cavity.

* * * * *